UNITED STATES PATENT OFFICE.

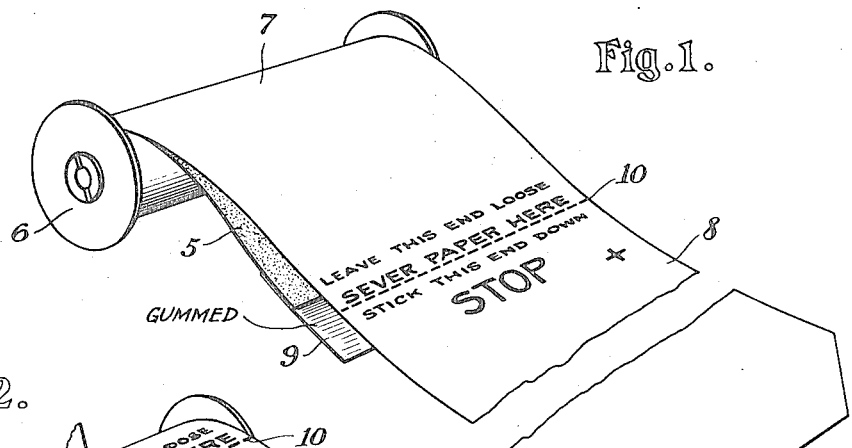
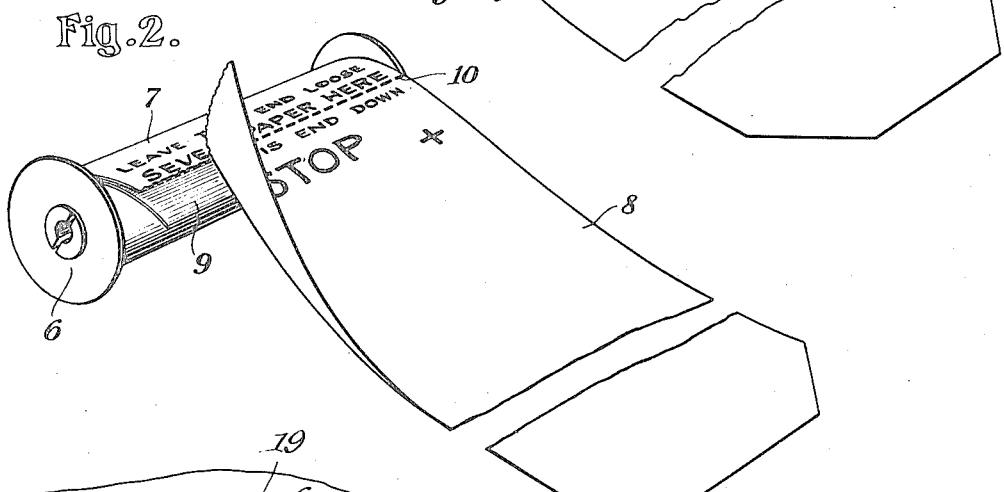
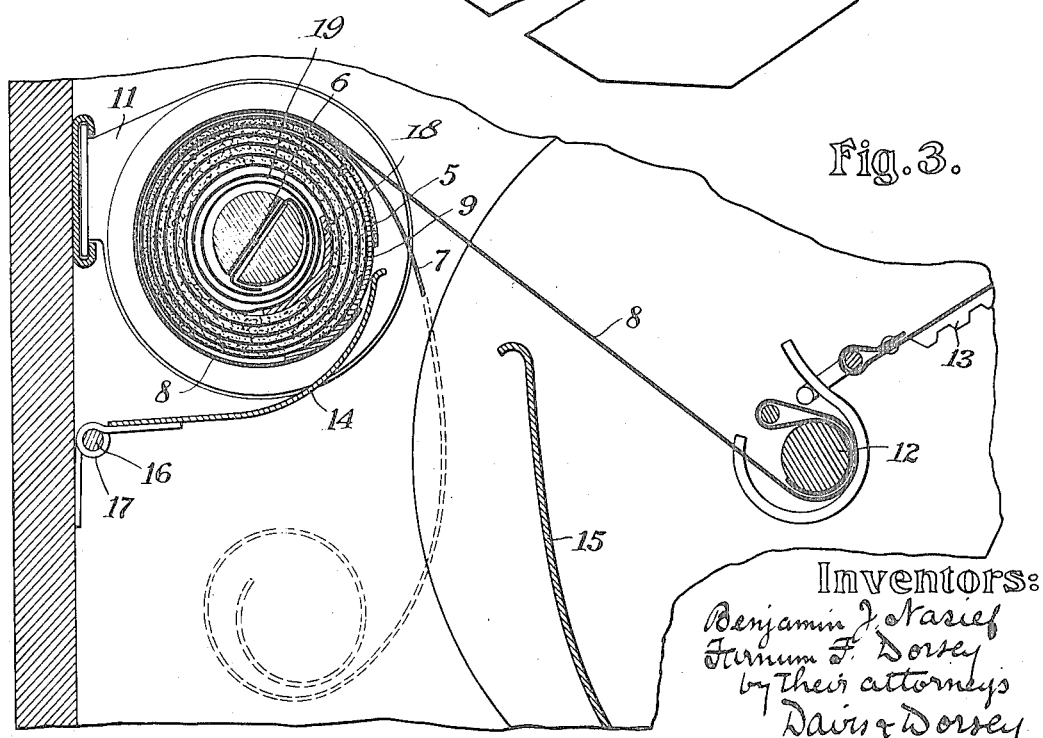

BENJAMIN J. NASIEF, OF NEW YORK, AND FARNUM F. DORSEY, OF ROCHESTER, NEW YORK, ASSIGNORS TO ANSCO COMPANY, OF BINGHAMTON, NEW YORK, A CORPORATION.

FILM-PACKAGE.

1,180,415.  Specification of Letters Patent.  Patented Apr. 25, 1916.

Application filed July 15, 1915. Serial No. 40,085.

*To all whom it may concern:*

Be it known that we, BENJAMIN J. NASIEF, a subject of the Sultan of Turkey, residing at New York, in the county of New York and State of New York, and FARNUM F. DORSEY, a citizen of the United States, and resident of Rochester, in the county of Monroe and State of New York, have invented certain new and useful Improvements in Film-Packages, of which the following is a specification.

This invention relates to film-packages of the well known form in which a strip of sensitized photographic film is wound upon a reel, together with a strip of opaque paper which serves both as a backing-strip or protection for the film against light, and as a leader for connecting the film with the reels and winding-devices used in the camera and in the developing-apparatus.

The object of the invention is to produce a film-package, of the type in question, so constructed and arranged that when the film is unwound from the reel and rewound in the machine characteristic of the "daylight" method of development, the paper strip shall be separated from the film so as not to be in contact with the film during the developing operation.

In a roll-film of the usual form the end of the film which is last to be exposed in the camera is not originally attached to the backing-strip, but is provided with a short strip of gummed paper, which may be termed the "connecting-strip", this connecting-strip being gummed to the film. After the removal of the reel from the camera the backing-strip must be unwound until the connecting-strip is reached, and this strip is then gummed to the backing-strip, so that in rewinding the film in the developing machine the backing-strip serves as a leader for the film. In accordance with the present invention we employ a backing-strip and a connecting-strip, but these parts are so formed and arranged that when the package is prepared for introduction into the developing-machine the outer end of the film is provided with a leader, independent of the backing-strip, by which it may be drawn into engagement with the developing-apron, while the backing-strip terminates loosely at a point adjacent the outer or forward end of the film-strip. Consequently, when the film is rewound this severed outer end of the backing-strip projects loosely from the reel, when it is reached by the rotation of the latter in the unwinding operation, and this loose end may then be guided, by suitable instrumentalities, into a position in which it is clear of the film during the rewinding operation, thus separating the backing-strip entirely from the rewound film.

In the accompanying drawings:—Figure 1 is a perspective view showing a film-package constructed in accordance with the present invention, partially unwound and with the parts in their condition previous to the preparation of the package for developing; Fig. 2 is a perspective view showing the operation of severing the leader from the backing-strip; and Fig. 3 is a vertical section, on an enlarged scale, showing the manner in which the backing-strip is separated from the film in the developing-machine.

The invention is illustrated as embodied in a film-package having the usual strip 5 of sensitized film, which is wound upon the usual reel 6. A combined backing-strip and leader 7, 8, of opaque paper, is interwound with the film and extends sufficiently beyond the film to provide a leader for the usual purposes. The film is provided, in the usual manner, with a connecting-strip 9 of gummed paper, the gummed surface being directed toward the adjacent surface of the backing-strip.

In its original condition the illustrated film-package differs from the ordinary film-package only in having a transverse line of demarcation 10 on the outer surface of the backing-strip, this line being located so as to register with the connecting-strip 9, and slightly in advance of the outer end of the film-strip. This line indicates a point at which the backing-strip is to be severed by the user, and while it is preferably produced by perforating or otherwise weakening the paper, so that it may be easily torn at the proper point, a simple printed line or mark may be employed instead, in which case, however, a sharp instrument is necessary for severing the paper. The inner end of the film-strips 5, that is, the end which is first exposed in the camera and which is therefore adjacent the reel 6 when the film-package is in the condition shown in the drawings, is attached to the backing-strip by the usual connecting-strip 18, and the backing-strip extends, in the usual manner, beyond this end of the film-strip to form a leader 19 for leading the film through the camera in the first instance.

The illustrated film-package does not attain completely its distinctive and novel form until it has been prepared for the developing-machine, and this preparation is made by severing the paper, as shown in Fig. 2, and then attaching the outer part 8 to the gummed strip, this part 8 thereafter constituting a leader for the film, while the outer end of the part 7, which constitutes distinctively the backing-strip, is left loose.

In Fig. 3 the reel 6 is shown as mounted in the adjustable supports 11 which are commonly employed in a daylight developing-machine of the usual form. The figure shows also the spindle 12 upon which the film and the developing-apron 13 are wound together. In addition to these usual parts, however, the machine is shown as provided with a guide-plate 14, which is mounted on a hinge 16, and is pressed upwardly by a spring 17 so as to engage the film-roll. A second guide-plate 15 is located between the film-roll and the winding-spindle. After the film-package has been prepared as above described the leader 8 is partially rewound upon the reel, and the reel is introduced into the developing-machine. The leader is then attached to the spindle 12. When the spindle is rotated the leader unwinds from the reel until the outer end of the backing-strip 7 is reached, as shown in Fig. 3. Since this end is not in any way attached either to the film or to the leader, however, it does not follow the leader, nor does it continue around with the film. Accordingly, it projects outwardly from the reel into the space between the guides 14 and 15, and as the rotation of the reel is continued in the rewinding operation the entire backing-strip passes into this space, where the strip may coil itself loosely, as indicated in dotted lines. In this manner the film is rewound free from the backing-strip. When the inner end of the film is reached, since this end is attached to the backing-strip, the latter may then be drawn out again from the space between the guides 14 and 15, and be wound with or upon the apron, but since it is entirely beyond the end of the film this is of no consequence.

The present invention provides, in a simple and effective manner, for separating the backing-strip from the film prior to the developing operation, and thus we are enabled to entirely avoid both the inconvenience resulting from the tendency of the backing-strip to stick to the film when moistened, and also the possibility of staining the film, in case the backing-strip is covered with any soluble dye or coloring matter.

The invention has been described as embodied in a form in which, for the sake of simplicity and economy in manufacture, the backing-strip and the leader 8 are formed of a single piece of material, and in which the structure does not assume the distinctive character of the invention until the user has severed these parts and secured the leader to the connecting-strip. It will be apparent, however, that the invention is not limited to this embodiment, but that the construction and arrangement of parts defined in the following claims may be produced and completed by the manufacturer, in which case the user will be relieved of the necessity of making any preparation of the package whatever, as a preliminary to the use of the developing-machine, even the usual operation of gumming the connecting-strip to the backing-strip being unnecessary.

We claim:—

1. The combination of a film-strip; a backing-strip which is attached to one end of the film-strip but extends beyond said end so as to constitute a leader, the backing-strip extending to and terminating at, but being free from, the other end of the film-strip; and a leader attached to said other end of the film-strip and extending beyond the end of the backing strip.

2. In a film-package, the combination of a film-strip, a backing-strip adapted to be interwound with the film-strip and terminating adjacent one end of the latter; a leader; and a connecting-strip attached to the inner end of the leader and the said end of the film-strip; the adjacent end of the backing-strip being free from both the film-strip and the leader so that it may be separated therefrom in the rewinding operation.

BENJAMIN J. NASIEF.
FARNUM F. DORSEY.